(12) United States Patent
Nyman et al.

(10) Patent No.: US 8,119,011 B1
(45) Date of Patent: Feb. 21, 2012

(54) OPTIMIZED ALUMINA COAGULANTS FOR WATER TREATMENT

(75) Inventors: May D. Nyman, Albuquerque, NM (US); Thomas A. Stewart, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 540 days.

(21) Appl. No.: 12/369,042

(22) Filed: Feb. 11, 2009

(51) Int. Cl.
*C02F 1/52* (2006.01)
*C02F 1/56* (2006.01)

(52) U.S. Cl. ........ 210/725; 210/716; 210/723; 210/724; 210/727; 210/737; 252/175

(58) Field of Classification Search .................... 210/716
See application file for complete search history.

(56) References Cited

U.S. PATENT DOCUMENTS

| | | | | |
|---|---|---|---|---|
| 4,566,986 | A * | 1/1986 | Waldmann | 252/175 |
| 4,981,675 | A * | 1/1991 | Haase et al. | 423/556 |
| 5,246,686 | A * | 9/1993 | Cuer et al. | 423/467 |
| 6,036,935 | A * | 3/2000 | Dulko | 423/462 |
| 6,174,445 | B1 * | 1/2001 | Reilly et al. | 210/716 |

OTHER PUBLICATIONS

Ezwald, J K, "Coagulation in Drinking-Water Treatment-Particles, Organics and Coagulants", vol. 2711, 1993, pp. 21-35.
Yan, Mingquan, et al, Enhanced Coagulation for High Alkalinity and Micro-Polluted Water: The Third Way through Coagulant Optimization, Water Research 42 (2008) 2278-2286.
Bradley, Susan M., et al, Characterization of the $GaO_4Al_{12}(OH)_{24}(H_2O)_{12}^{7+}$ Polyoxocation by MAS NMR and Infrared Spectroscopies and Powder X-ray Diffraction, Inorg. Chem. 1992, 31, 1181-1185.
Bradley, Susan M., et al, "The Structure of Al Gels Formed through the Base Hydrolysis of Al3+ Aqueous Solutions", Journal of Colloid and Interface Science 159, 405-412, (1993).

* cited by examiner

*Primary Examiner* — Peter A Hruskoci
(74) *Attorney, Agent, or Firm* — Daniel J. Jenkins

(57) ABSTRACT

Substitution of a single Ga-atom or single Ge-atom ($GaAl_{12}$ and $GeAl_{12}$ respectively) into the center of an aluminum Keggin polycation ($Al_{13}$) produces an optimal water-treatment product for neutralization and coagulation of anionic contaminants in water. $GaAl_{12}$ consistently shows ~1 order of magnitude increase in pathogen reduction, compared to $Al_{13}$. At a concentration of 2 ppm, $GaAl_{12}$ performs equivalently to 40 ppm alum, removing ~90% of the dissolved organic material. The substituted $GaAl_{12}$ product also offers extended shelf-life and consistent performance. We also synthesized a related polyaluminum chloride compound made of pre-hydrolyzed dissolved alumina clusters of $[GaO_4Al_{12}(OH)_{24}(H_2O)_{12}]^{7+}$.

19 Claims, 5 Drawing Sheets

OPTIMIZED ALUMINA COAGULANTS FOR WATER TREATMENT

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

Diminishing clean water supplies, due to increasing population and pollution, coupled with more stringent government regulations, require more effective materials for water treatment technologies. A global water crisis has forced us to redefine potable water resources to include challenged supplies, such as surface, brackish, produced and recycled waste water. Front-end water treatment technologies, coagulation in particular, should ideally remove the majority of organic, inorganic and microbiological contaminants to both ensure a consistent product and avoid the downstream treatment problems of disinfection byproducts and inorganic- or bio-fouling of filtration media.

Commercial coagulants for water treatment are usually some form of an iron or aluminum salt. If the pH is high enough, or by adjusting the pH (generally 7-8), a metal oxide/hydroxide precipitate/coagulant/floc forms that brings down water contaminants such as clay and organic matter. It is designed as a clarification process; but certain coagulant formulations are also effective in removing microbiological contaminants or pathogens. These can include viruses, bacteria and protozoa such as cryptosporidium.

The most commonly employed inorganic coagulants are ferric chloride and aluminum sulfate (alum). However, pre-hydrolyzed aluminum (or PACl—polyaluminum chloride) has consistently shown enhanced removal of a variety of contaminants, including natural organic matter (NOM), bacteriophage as model viruses, and turbidity (clays). Removal of *Cryptosporidium* via PACl/prehydrolyzed aluminum has given mixed results, when compared to the performance of alum or ferric. Additional commonly-known advantages of PACl over alum in particular include a wider optimal effective pH range, minimal pH change of the treated water, less temperature dependence, and smaller required dose-rate for equivalent or better water clarification. Disadvantages of PACl included the higher cost (but perhaps offset by lower dose rates) and reduced shelf-life.

The efficacy of PACl is attributed to soluble polycationic species that form upon base-hydrolysis of aqueous aluminum salt solutions. The most abundant polycationic specie is the $\epsilon$-Keggin ion, $[Al_{13}O_4(OH)_{24}(H_2O)_{12}]^{7+}$ ($Al_{13}$). The widely accepted mechanism of contaminant removal is by charge-neutralization of anionic species, including clay particles, natural organic matter, viruses, bacteria, and spores. A better understanding of the efficacy of the $Al_{13}$ Keggin ion in the contaminant removal process has lead to an optimization of aluminum coagulants. Issues that we considered include: 1) How does acid-base chemistry of aqueous $Al_{13}$ affect its ionic charge in typical raw water media? 2) Is the alumina that precipitates from PACl the same as that which precipitates from alum during the coagulation process? 3) What is the source of PACl instability and how can this issue be dealt with?

To probe these questions, we have compared the aqueous behavior and contaminant removal efficacy of $Al_{13}$ to its related Ga- and Ge-centered analogues ($[GaAl_{12}O_4(OH)_{24}(H_2O)_{12}]^{7+}$=$GaAl_{12}$; $[GeAl_{12}O_4(OH)_{24}(H_2O)_{12}]^{8+}$=$GeAl_{12}$). The $\epsilon$-Keggin ion is illustrated in FIG. 1. Structurally, $Al_{13}$, $GaAl_{12}$ and $GeAl_{12}$ are nearly identical. However, the rate of ligand exchange of water and hydroxyl ligands and the acidity of the bound-water protons vary significantly as a function of composition trending: $GaAl_{12} < Al_{13} < GeAl_{12}$ and cluster stability to ligand exchange is $GaAl_{12} > Al_{13} > GeAl_{12}$. Thus, while $GeAl_{12}$ provides an isostructural polycation with a charge even higher than $Al_{13}$, the relatively stable/inert $GaAl_{12}$ affords the opportunity to investigate the issue of shelf-life of $Al_{13}$-containing PACl. Since the central metal (Ga or Ge) of the Keggin ion is completely shielded by the twelve alumina octahedral, but significantly influences the molecules' aqueous chemistry, this work presents the perfect opportunity to probe and ultimately improve the mechanism of $Al_{13}$ efficacy in water purification.

We performed a series of contaminant removal tests utilizing solutions of $GaAl_{12}$, $Al_{13}$, or $GeAl_{12}$ added to raw river water from the Rio Grande in Albuquerque, N. Mex. Control studies using either alum or ferric were done in parallel, and we compared the removal of bacteriophage, dissolved organic carbon, *Cryptosporidium*, and turbidity using these coagulants and coagulant analogues. Electrospray Ionization Mass Spectrometry (ESI MS) measurements of aqueous solutions of $GaAl_{12}$, $Al_{13}$, or $GeAl_{12}$ provided information on the aqueous forms of these species, while $^{27}Al$ and $^{71}Ga$ solid-state Magic Angle Spinning Nuclear Magnetic Resonance (MAS NMR) revealed the state of the precipitated flocs.

SUMMARY OF THE INVENTION

The substitution of a single Ga-atom or single Ge-atom ($GaAl_{12}$ and $GeAl_{12}$ respectively) into the center of an aluminum Keggin polycation ($Al_{13}$) produces an optimal water-treatment product for neutralization and coagulation of anionic contaminants in water, and producing cleaner water. $GaAl_{12}$ consistently shows ~1 order of magnitude increase in pathogen reduction, compared to $Al_{13}$. At a concentration of 2 ppm, $GaAl_{12}$ performs equivalently to 40 ppm alum, removing ~90% of the dissolved organic material. The substituted $GaAl_{12}$ product also offers extended shelf-life and consistent performance. We also synthesized a related polyaluminum chloride compound made of pre-hydrolyzed dissolved alumina clusters of $[GaO_4Al_{12}(OH)_{24}(H_2O)_{12}]^{7+}$.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
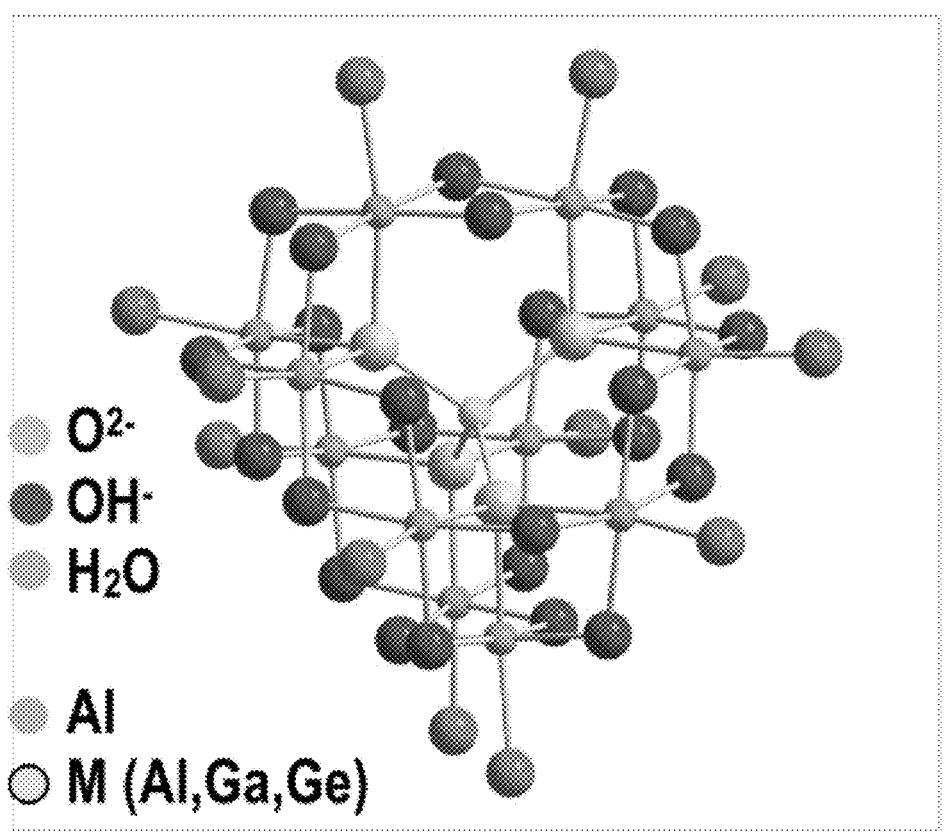
FIG. 1. Ball-and-stick model of the $\epsilon$-Keggin ion: $[MO_4Al_{12}(OH)_{24}(H_2O)_{12}]^{x+}$; M=Ga, Al, Ge, x=7 for M=Al, Ga and x=8 for M=Ge. Solid-state structures of the clusters vary minimally with central metal substitution: For the central $MO_4$ tetrahedron (yellow), M-O ~1.83 Å for M=Al, M-O ~1.89 Å for M=Ga, and M-O ~1.80 Å for M=Ge. All Al—O bond lengths of the octahedral aluminum (turquoise) vary from ~1.8-2.0 Å for all three compositions, $Al_{13}$, $GaAl_{12}$ and $GeAl_{12}$.

The most effective commercially available coagulant for pathogen removal is known as PACl, or polyaluminum chloride. Polyaluminum chloride contains a variety of pre-hydrolyzed dissolved alumina clusters; $Al_{13}$, or $[AlO_4Al_{12}(OH)_{24}(H_2O)_{12}]^{7+}$ in particular. We have found that alumina based coagulants for pathogen mitigation, water clarification and removal of organic contaminants from water via coagulation are enhanced by introducing a small amount of gallium into the hydrolyzed alumina. We have synthesized a related compound $GaAl_{12}$ by substitution of a Ga to form $[GaO_4Al_{12}(OH)_{24}(H_2O)_{12}]^{7+}$. The $Al_{13}$-Keggin ion for neutralization and coagulation of anionic contaminants in water is even more effective with Gallium (Ga) or Germanium (Ge) substituted in the central-site of the molecule.

Unexpectedly, we found that the substituted molecule, $GaAl_{12}$, is more effective than $Al_{13}$ by approximately an order of magnitude for removing pathogens, and it outperforms common coagulants; ferric chloride, alum and the $Al_{13}$-based products, in all tests including water clarification, removal of dissolved organic substances, and minimal residual aluminum. $GaAl_{12}$, also has improved shelf-life over $Al_{13}$. Furthermore, with the improved performance, less coagulant and coagulant aids are necessary, improving the affordability of this optimized alumina coagulant.

$GaAl_{12}$ and $Al_{13}$ are generally referred to as alumina Keggin ions, and the $GaAl_{12}$ Keggin ion is more stable than the $Al_{13}$ Keggin ion. This stabilization results in better efficacy in removing cultured model bacteriophage from laboratory solutions (Table 1) and wild-type bacteriophage from river water (Table 2). In Table 2, the performance of $GaAl_{12}$ (and $Al_{13}$) is also compared to that of alum, a commonly used coagulant. $GaAl_{12}$ consistently shows ~1 order of magnitude increase in pathogen reduction, compared to $Al_{13}$. Table 3 shows the results of water clarification studies, comparing $GaAl_{12}$ to the $Al_{13}$, alum and ferric chloride (another commonly-used coagulant). The EPA standard for drinking water is 0.3 nephlometric turbidity units (NTU); so $GaAl_{12}$ is the only coagulant we tested that meets this standard, other than ferric chloride. Oftentimes it is necessary to add a coagulant aid such as an anionic polymer, but this is not the case with $GaAl_{12}$. In Table 4, we show the removal of dissolved organic contaminants, comparing the $GaAl_{12}$ coagulant to $Al_{13}$ and alum. The A254 method is used here; where concentration of unsaturated carbons and aromatic carbons (generically referred to as humic substance) is quantified via the 254 nm adsorption in the UV spectrum.

These results show that a concentration of 2 ppm $GaAl_{12}$ performs equivalently to 40 ppm alum, removing ~90% of the dissolved organic material. Additionally, 5 ppm $GaAl_{12}$ coagulant removes ~20% more humic substance than the same amount of $Al_{13}$ coagulant. Also listed in Table 4 is the residual aluminum, post-treatment. While all coagulants tested fall within the EPA range (EPA standard for residual aluminum is 0.05-0.2 ppm); the $GaAl_{12}$ again is superior with the lowest Al concentration.

Another advantage offered by $GaAl_{12}$ over $Al_{13}$ is longer shelf-life, and consistent performance of the product. $Al_{13}$ destabilizes by aggregation and eventual precipitation of larger oligomers. $GaAl_{12}$ does not undergo this process (determined by light scattering experiments of solutions, as well as ESI-MS—electrospray ionization mass spectroscopy). Therefore the composition, concentration and species distribution remains constant longer, which are all important parameters for consistent water treatment performance.

Preparation of pure $GeAl_{12}$, $Al_{13}$ and $GaAl_{12}$ solutions. Crystalline salts of $Na[AlO_4Al_{12}(OH)_{24}(H_2O)_{12}(SO_4)_4].xH_2O$, $[GeO_4Al_{12}(OH)_{24}(H_2O)_{12}](SO_4)_4.14H_2O$ and $Na[GaO_4Al_{12}(OH)_{24}(H_2O)_{12}(SO_4)_4].xH_2O$, were synthesized by literature methods. Cluster solutions were obtained by $BaSO_4$ metathesis, using either $BaCl_2$ or $Ba(NO_3)_2$. For example, 1 gram of $[GeO_4Al_{12}(OH)_{24}(H_2O)_{12}](SeO_4)_4.14H_2O$ and 0.43 grams of $BaCl_2$ are ground in methanol until dry, using mortar and pestle. The powder is placed in 10 ml DI water and stirred for two hours, centrifuged, 0.2 micron-filtered, then immediately diluted by 10× to avoid precipitation. Appropriate dilutions for experiments are done after Al analysis by either a Hach assay or ICP-MS (PerkinElmer, Elan 6100).

Synthesis of $Al_{13}$ and $GaAl_{12}$ solutions. Water treatment experiments were also carried out with "crude" $Al_{13}$ or $GaAl_{12}$ solutions, to determine if the metathesis "purification" was beneficial in practical applications. For $GaAl_{12}$: 0.4 grams NaOH is added to 50 ml DI $H_2O$. Anhydrous $GaCl_3$ (0.28 g) is added to the NaOH solution. $AlCl_3.6H_2O$ (4.83 grams) is dissolved in 100 ml DI $H_2O$ (in 250 ml Erlenmeyer flask). The aluminum chloride solution is stirred (~300 RPM) at 90° C. A 50-ml plastic syringe is loaded with the prepared NaOH/$GaCl_3$ solution and dispensed by syringe pump at a rate of 20 ml/hr. After the hydrolysis step (approx. 2.5 hrs), the solution is heated and stirred for an additional 9.5 hrs. The solution is then checked by $^{71}Ga$ NMR ($\delta$=138 ppm) to confirm the Keggin ion is formed, and by ICP-MS to determine concentration of aluminum. $^{27}Al$ NMR of these solutions confirmed that essentially no $Al_{13}$ was formed, indicated by the absence of the $\delta$=62 ppm peak. The $Al_{13}$ solution was prepared in an identical manner; but without the addition of the gallium salt, and the post-heating step was carried out for only 30 minutes. These solutions were checked by $^{27}Al$ NMR ($\delta$=62 ppm for the tetrahedral $AlO_4$-site, and usually some monomer at $\delta$~0 ppm was also observed).

Preparation of Alumina Flocs. Model Gels or Flocs were Prepared by Addition of an alumina solution; alum, $Al_{13}$ or $GaAl_{12}$ to a 0.05 M $HNaCO_3$ buffered solution with a starting pH of around 8.3. A crude 0.1 M Al solution (30 ml) of $Al_{13}$ or $GaAl_{12}$ was added to 500 ml $HNaCO_3$ solution while stirring at room temperature at 300 rpm. A floc or precipitate was observed immediately and the solution stirred for 20 minutes more. For the alumina floc from alum, a 0.03 molar solution was utilized due to the lower solubility; and the rest of the procedure was the same. These flocs were isolated by centrifugation, and washing with DI water. Finally, the alumina flocs were dried in a vacuum oven at 70° C. overnight. The glassy powders were ground with a mortar and pestle into a powder for further characterization.

$^{27}Al$ MAS NMR experiments of the alumina flocs were performed on a Bruker Avance 600 instrument at an $^{27}Al$ frequency of 156.38 MHz. Chemical shifts were referenced to 1M aluminum nitrate, δ=0.0 ppm. Spinning speed was 15 khz.

$^{71}$Ga MAS NMR experiments. All NMR experiments were performed on a Bruker Avance 600 instrument at a $^{71}$Ga frequency of 183.13 MHz. Chemical shifts were referenced to 1M Ga(H$_2$O)$^{6+}$, δ=0.0 ppm. Spinning speed was 12.5 kHz, DMFIT was used for deconvolutions.

TEM. Samples were diluted in PBS and mounted onto 6-nm thick carbon films supported by tabbed copper grids. Incubation proceeded for five minutes, followed by sample removal by blotting with Whatman #1 filter paper until either a thin film remained (for negative staining) or until dry (direct imaging). Negative staining of the samples consisted of incubating the grids on droplets of 2% uranyl acetate in water for two minutes, then blotting away the stain and drying. Dried tabs were removed from the grids, then the samples were imaged in a Hitachi H7500 transmission electron microscope and an Advanced Microscopy Techniques XR60 bottom mount camera.

ESI-MS data was acquired on an Agilent 1956b single-quadrupole mass spectrometer at a cone voltage of −20 V. Freshly prepared samples were introduced at 20 µl/min using a syringe pump.

Cultivation of infectious agents. *Escherichia coli* strain C3000, from American Type Culture Collection (ATCC), was maintained for up to six serial passages at 36°±1° C. either in tryptic soy broth (TSB) or on agar (TSA, 1.4% agar).

The MS-2 bacteriophage (ATCC strain 15597-B1™) used in viral clearance experiments, was reconstituted according to ATCC instructions and expanded into an early log-phase *E. coli* culture to produce a high-titer seed stock. The concentration of plaque forming units (pfu) in the broth was determined after 0.22-micron filtration, using the double agar layer assay described below, and was adjusted to approximately $2 \times 10^{10}$ pfu mL$^{-1}$ with Dulbecco's phosphate buffered saline (DPBS) before freezing aliquots at −20° C.

For analysis by NMR and TEM, MS-2 propagation was scaled to 200 mL. Virus-rich filtrate was dialyzed against 50 volumes of deionized water containing 0.01% NaN$_3$, using Spectra/Por® 2 membranes (Spectrum, 12,000-14,000 mwco). Viral particles, along with any remaining polypeptides from TSB, were precipitated by adding aluminum clusters with slow stirring to obtain 40 ppm aluminum. After 14-16 hours at 4° C., precipitates were twice centrifuged and washed with deionized water, and remained in aqueous suspension for TEM or were freeze-dried for NMR.

Native coliphages were isolated from 0.22 micron-filtered water collected from the Rio Grande. Initially, the river water was subjected to a plaque assay with *E. coli* host. From the resulting petri dishes, 25 plaques were selected at random, pooled in 5 mL of DPBS with vigorous agitation, and the supernatant was 0.22 micron-filtered. The presumably heterogeneous isolate population was expanded in an *E. coli* broth culture, yielding a working stock of wild type coliphages that retained consistent viability under refrigeration.

Double Agar Layer Plaque Assay (plaque assay). Plaque assays were performed as described in the USEPA Manual of Methods for Virology. Briefly, test samples were diluted in sterile DBSS, with a target of 100-300 pfu mL$^{-1}$, and combined with *E. coli* host cells in soft TSA (0.7% agar) at 44±1° C. The molten mixture was layered onto standard TSA in a 100 mm petri dish and allowed to solidify. Plaques were counted after 14 to 16 hours of incubation.

*Cryptosporidium parvum*. Coagulants were compared to demonstrate their ability to flocculate and remove irradiated *C. parvum* oocysts (BTF, Sydney, Australia) from Rio Grande water by sedimentation. Duplicate vials of 0.22-micron filtered, but otherwise untreated, water at pH 8.1 were seeded at $1.0 \times 10^7$ mL$^{-1}$ and dosed with specified coagulants at 10 mg/L Al or Fe. Vials were mixed by inversion initially and every five minutes for 15 minutes, then allowed to settle for 15 minutes, after which 10-µL samples were withdrawn from the center of each vial. Oocyst concentrations were determined microscopically using a hemacytometer.

Water Treatment Experiments. The efficacy of aluminum clusters in viral clearance was tested in sterile centrifuge tubes. Coagulant solutions and MS-2 bacteriophages were added to deionized water to achieve specified concentrations of aluminum and 0.8 to $1.3 \times 10^8$ pfu/ml. After mixing by inversion, each treatment or control mixture was allowed to react for 10 minutes, followed by a five minute, 1200 rcf centrifugation. While ineffective on individual virus particles, the gentle centrifugation settled any flocs. Experiments using native coliphages were in 0.22 micron-filtered river water and a starting load of 0.5 to $0.7 \times 10^8$ pfu/ml. Supernatants from replicate tubes for each treatment were tested using the plaque assay.

Rio Grande Water. Water was collected at a diversion dam for the San Juan-Chama Drinking Water Project (Albuquerque, N. Mex.) in April, 2008. Water conditions were recorded as follows: pre-settled turbidity =121 ntu; turbidity post-24 hr settling=63 ntu; TOC=4.5 ppm; TDS=177 ppm; pH ~8.1, total alkalinity 89 mg/mL.

Experiments to evaluate the clearance of turbidity and dissolved organic contaminants (DOC) utilized settled river water. Flasks for testing treatment conditions each contained 200 mL of raw water to which coagulant concentrates were added with slow stirring (30 rpm) and pH 8.1 was measured. Stirring was discontinued after 10 minutes and any flocculation was allowed to settle for 20 minutes. In lieu of sand filtration, typical in post-coagulation processes, the samples were gravity-fed through qualitative filter paper (Whatman, No. 1), and analyzed by turbidimiter (Hach model 2100P), by absorbance at 254 nm (Shimadzu UV-3600) for DOCS).

Contaminant Removal Studies with GeAl$_{12}$ Al$_{13}$ or GaAl$_{12}$

Figure 2:
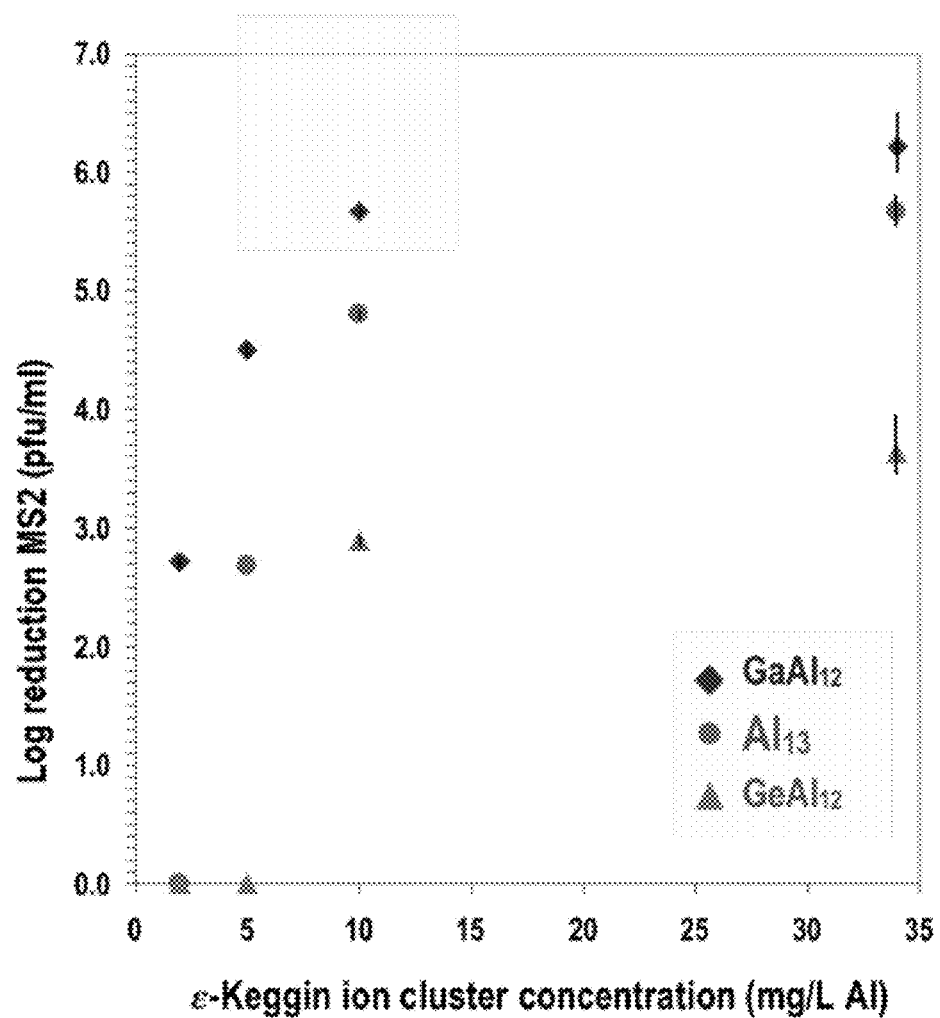
FIG. 2. MS-2 bacteriophage population reduction by $GaAl_{12}$, $Al_{13}$ and $GeAl_{12}$. MS-2 population in controls: for 34 mg/L Al dose, $7.50 \times 10^8$ pfu/ml; for 10 mg/L dose, $9.83 \times 10^7$ pfu/ml; for 2 & 5 mg/L doses, $1.27 \times 10^8$ pfu/ml. Error bars indicate range on 2-3 replications.

MS-2 bacteriophage. The first set of tests for contaminant removal was carried out in a controlled laboratory media; DI water with PBS buffer, using the MS-2 bacteriophage as a model virus. MS-2 is commonly used to model viruses in water treatment studies. FIG. 2 shows the log reduction of MS-2 (~$10^8$ titer) by ion dosage (2, 5, 10 and 34 mg/L Al). The dosages of both MS-2 and the various aluminum clusters were optimized to quantify differences in the performance of the three clusters, which were remarkable. Unexpectedly, we found that GaAl$_{12}$ is capable of reducing the MS-2 population at a dose of 2 mg/L Al; while Al$_{13}$ requires a dose of at least 5 mg/L Al to achieve similar population reductions, and GeAl$_{12}$ requires a dose equivalent of 10 mg/L Al. (NOTE: for these studies and others reported below, all Al concentrations are normalized to account for differences in GeAl$_{12}$, Al$_{13}$ and GaAl$_{12}$ stoichiometries so that identical Keggin ion concentrations are compared.) The difference in performance between the Keggin clusters diminishes with increasing cluster dose. For example, at 34 mg/L Al, the performance of Al$_{13}$ approaches that of GaAl$_{12}$, only about half an order of magnitude less effective in log reduction, perhaps indicating some sweep flocculation in addition to charge-neutralization as the mechanism of virus removal at higher Keggin ion doses.

Figure 3:
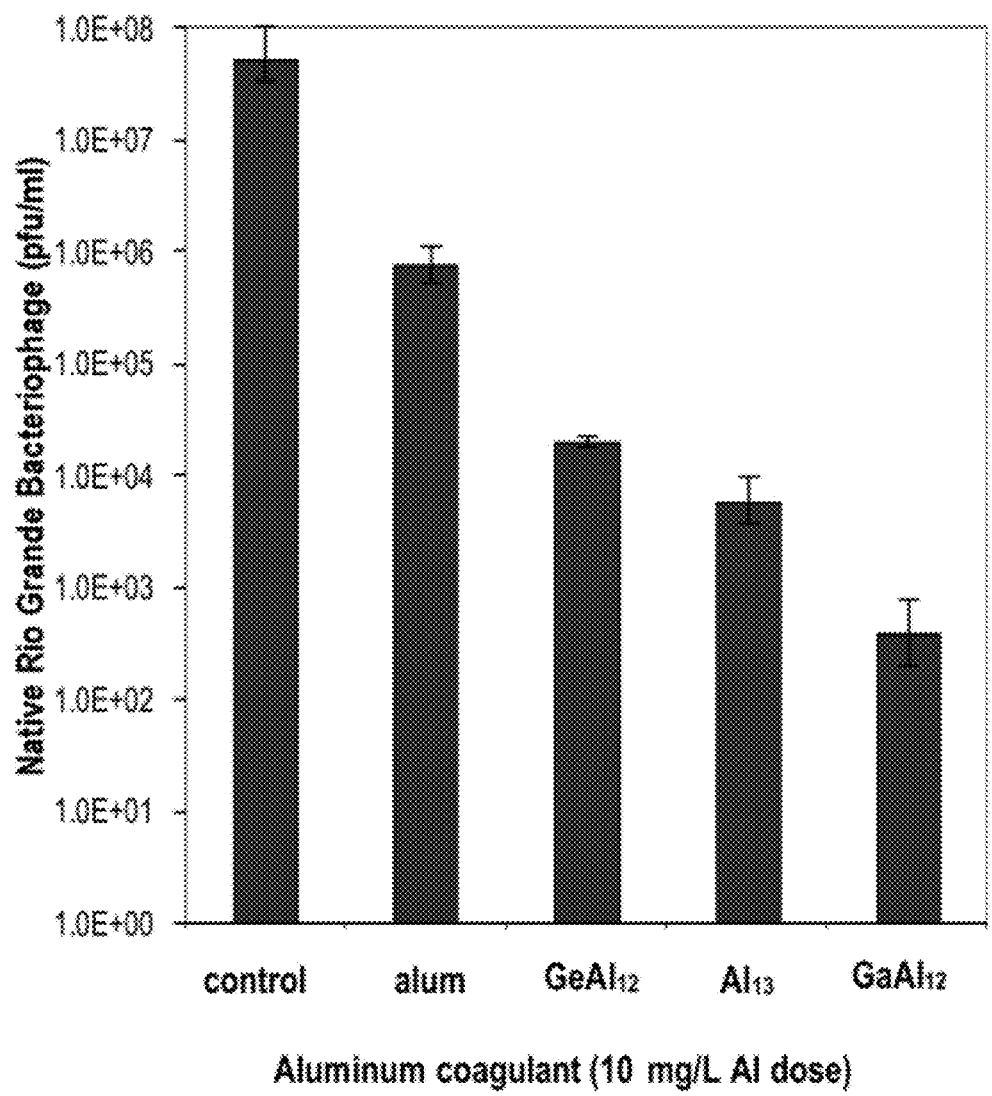
FIG. 3. Inactivation of native wild-type bacteriophages in Rio Grande water (Albuquerque, N. Mex., USA); comparing the efficacy of alum, $GeAl_{12}$, $Al_{13}$ and $GaAl_{12}$. Error bars indicate range on two replications.

Wild-type bacteriophage. Native wild-type bacteriophages were isolated from raw river water from the Rio Grande, Albuquerque, N. Mex., the population was expanded on an *E. Coli* host, and then reintroduced to the river water at a concentration of $5 \times 10^7$ pfu/ml (see experimental). These river water samples were then dosed with 10 mg/L Al solutions, and the log-reduction of the wild-type bacteriophage was quantified (see FIG. 3). In this study, alum (10 mg/L Al) was utilized in parallel, for comparison to the Keggin ion coagulants. Consistent with the MS-2 studies, the ability of the coagulants to reduce the bacteriophage population is: $GaAl_{12}>Al_{13}>GeAl_{12}>$alum and spans 3.5 orders of magnitude; ranging from ~2-log reduction for alum to ~5-log reduction for $GaAl_{12}$.

*Cryptosporidium parvum.* In Table 5, we compare the use of coagulants $GaAl_{12}$, $Al_{13}$, $GeAl_{12}$, ferric or alum at 10 mg/L metal dose to cryptosporidium-spike raw river water (1.02× $10^7$/ml). In this study, alum performed significantly worse than the other coagulants, with only 17.5% removal of the *Cryptosporidium*. The three Keggin ions exhibited the consistent trend of $GaAl_{12}>Al_{13}>GeAl_{12}$, but there was little difference between the three coagulants when described as %-removal. The ferric did not perform quite as well as the Keggin ions, but significantly better than the alum. This study had particular significance in that *Cryptosporidium* is infamous for its resistance to chlorination, and thus it is especially important to demonstrate that its removal can be accomplished by front-end water treatment technologies.

Turbidity. Removal of turbidity in Rio Grande water (predominantly due to clay particles) resulting in water clarification also trended as $GaAl_{12}>Al_{13}>GeAl_{12}$ (see Table 5). For this test, the standard ferric performed best, but $GaAl_{12}$ was comparable; and only $GaAl_{12}$ and ferric chloride met EPA standards for drinking water without further treatment.

Dissolved Organic Carbon. Unexpectedly, $GaAl_{12}$ also exhibited superior performance in removing dissolved organic carbon (DOC) from humic-acid-spiked Rio Grande water, compared to $GeAl_{12}$, $Al_{13}$, alum or ferric. (Table 6) In a second series of tests investigating just the performance of $GaAl_{12}$, the pH of the Rio Grande water was pre-adjusted, varying from 6.2 to 8.2, to determine its working range. In most tests, the $GaAl_{12}$ at 5 mg/L removed around 88% DOC. At the lowest pH values, lime was required for flocculation to occur, and the DOC removal dropped slightly to around 85%.

ESI-MS Studies of Aqueous $GeAl_{12}$, $Al_{13}$ and $GaAl_{12}$

In all water purification tests described above, the efficacy ranking of the aluminum clusters is $GaAl_{12}>Al_{13}>GeAl_{12}$. This was initially surprising, in that $GeAl_{12}$ has the highest charge of the three clusters in the solid-state; and the presumed mechanism of contaminant removal is by charge-neutralization, which tends to scale with ion charge. However, to understand this data, we need to consider the state of the clusters in aqueous solution. The aluminum clusters are fluxional in aqueous solution. They are generally acidic. Self-buffering pH of freshly extracted 0.1 M solutions of $GaAl_{12}$, $Al_{13}$ and $GeAl_{12}$ are 4.58, 4.47 and 4.37, respectively. They can both protonate at the hydroxyl ligand and deprotonate at the water ligand, as well as aggregate, which usually involves dehydration or deprotonation.

Electrospray Ionization Mass Spectrometry (ESI-MS) of solutions of $GaAl_{12}$, $Al_{13}$ or $GeAl_{12}$ revealed differences in the three clusters when otherwise identical solutions were ionized under the same conditions. Similar to aqueous behavior, deprotonation of the clusters is the major reaction, and the ESI-MS behavior is qualitatively consistent with the aqueous reactivity. The major ionic species of $GaAl_{12}$, $Al_{13}$ and $GeAl_{12}$ observed by ESI-MS are summarized in Table 7. The aluminum clusters undergo some association with sodium and nitrate ions; but overall, these ion pairs do not dominate the spectra. The major species of $GaAl_{12}$, $Al_{13}$ and $GeAl_{12}$ observed by ESI-MS have generally undergone 3-8 deprotonation steps; and the cluster charges, not including associated $NO_3^-$ or $Na^+$ ions, range from 0 to 4+. The three most abundant species of $GaAl_{12}$, $Al_{13}$ and $GeAl_{12}$ have undergone 3-4, 4-6, and 6-8 deprotonation steps, respectively, which is in qualitative agreement with aqueous acidities: $GeAl_{12}>Al_{13}>GaAl_{12}$.

In the $Al_{13}$ solution (Table 7), we also observe a small amount of the higher oligomer, the $Al_{30}$ polycation. There is no evidence, from repeated attempts to make a Ga- or Ge-centered analogue of the $Al_{30}$ that such higher oligomers exist without an aluminum core. However, broad humps are observed in the $GeAl_{12}$ spectrum in the approximate spectral region of the higher oligomer, as well as peak clusters that are less well-defined, that may indicate a mixture of species as a result of the $GeAl_{12}$ relative instability (see supplementary information). The effect of larger polycations or colloids on water treatments has not been well-studied. It was suggested in one report that higher $Al_{30}$ content in PACl solutions is linked to improved water clarification, but no studies to our knowledge have been reported on the efficacy in removal of contaminants such as DOC or microbes.

The aggregation of $Al_{13}$ in solution, forming larger polycations or colloids; has been detected via light scattering of aged solutions. By dynamic light scattering, we do observe aggregation in the $Al_{13}$ solution but never in the equivalent solutions of $GeAl_{12}$ or $GaAl_{12}$. A solution of $Al_{13}$ shows clusters of 700-900 nm in diameter after just 12 hours aging at room temperature, which can be eliminated by either centrifugation or filtration. The oligomerization and colloid formation in $Al_{13}$ solutions is very likely the cause of limited shelf-life of PACl. As the clusters become larger, their effective charge-to-size ratio becomes less, diminishing their ability to charge-neutralize anionic contaminants. As the large clusters precipitate as colloids, the Al-concentration becomes less, also decreasing the contaminant removal efficacy with time.

To summarize the aqueous state of $GaAl_{12}$, $Al_{13}$ and $GeAl_{12}$ in relation to their performance in the water treatment studies: 1) the aqueous charge of the species due to their acidity trends: $GaAl_{12}>Al_{13}>GeAl_{12}$, which is the same as their contaminant removal efficacy, and 2) $Al_{13}$ is also less effective than $GaAl_{12}$ due to its tendency to form $Al_{30}$ and larger colloids. Surprisingly, by several lines of evidence, $GaAl_{12}$ does not appear to undergo this process. Its ESI spectrum is 'clean' in the higher oligomer region, and it does not show colloidal growth by light-scattering studies. 3) $GeAl_{12}$ is both the most acidic and has evidence of oligomerization in the ESI spectrum, contributing to its poorer ability to neutralize anionic contaminants in water purification studies.

Solid-state Characterization of Alumina Flocs.

Figure 4:
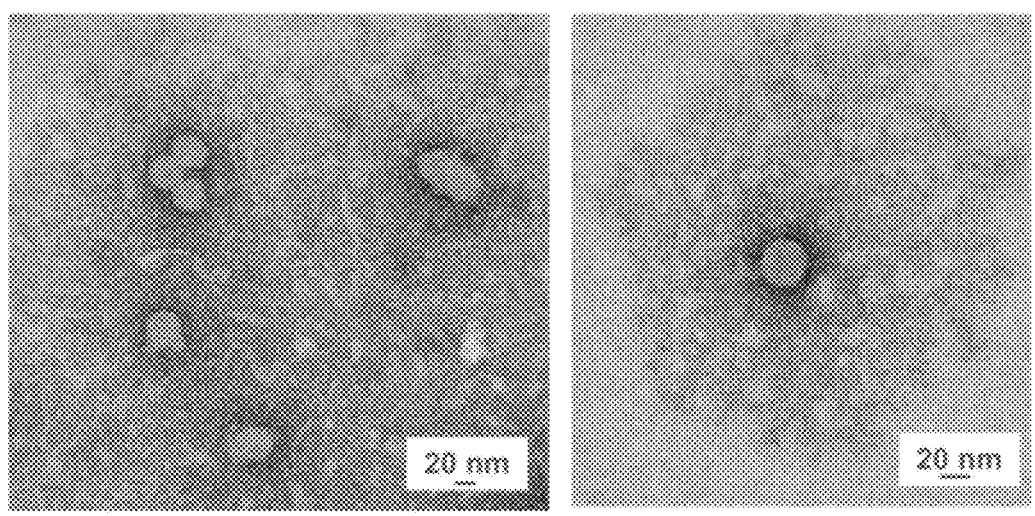
FIG. 4. TEM image of MS-2 bacteriophage in a $GaAl_{12}$ floc matrix. (Uranyl acetate stained).

FIG. 4 shows TEM images of an MS-2-$GaAl_{12}$ precipitate, in which there is a significantly high virus particle-to-$MAl_{12}$ (M=Ga, Al) ratio so that neutralization of the virus particle dominates over polymerization of the $Al_{13}$ or $GaAl_{12}$ polycations. In these images, we observe the fractal-type growth of the alumina precipitate, that has been described by prior small-angle X-ray scattering studies. Solid-state $^{27}$Al MAS NMR spectroscopy was used to identify the alumina species that adhere and flocculate the MS-2 virus.

Figure 5:
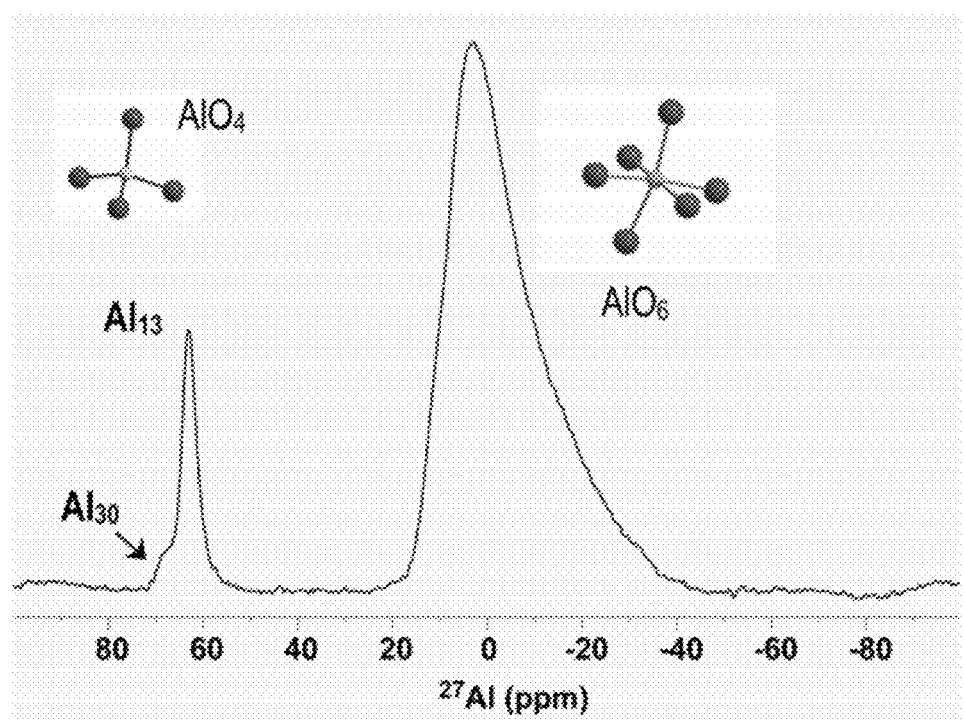
FIG. 5. $^{27}Al$ MAS NMR spectrum of MS-2-$Al_{13}$ floc showing the preservation of $Al_{13}$ and $Al_{30}$ clusters in the coagulated matrix.

FIG. 5 shows a $^{27}$Al MAS NMR of MS-2 neutralized by an $Al_{13}$ solution. The spectrum shows that the Keggin ions are remarkably well-preserved in the MS-2-$Al_{13}$ floc, consistent with other studies. The $AlO_4$ central tetrahedral site of the MS-2-$Al_{13}$ floc is δ=63.09 ppm, with a line width of 528 Hz. The $AlO_4$ peak of the $Na[AlO_4Al_{12}(OH)_{24}(H_2O)_{12}][SO_4]_4$·x $H_2O$ Keggin salt is δ=62.58 ppm, with a line width of 151 Hz. The small peak at 69 ppm in the MS-2-$Al_{13}$ floc is the tetrahedral site of $Al_{30}$, qualitatively consistent with the aluminum species populations observed by ESI-MS in the $Al_{13}$ solution. The octahedral aluminum peak of the MS-2-$Al_{13}$ floc is modeled as three peaks at 4.9, −3.4 and −17.6 ppm (standard $Al_{13}$ Keggin salt: δ=9.87, 9.95 and 13.97 ppm). For both the MS-2-$Al_{13}$ floc and the crystalline salt standard, the relative weight of the two peaks are both 10% tetrahedral and 90% octahedral, compared to the theoretical 8% tetrahedral and 92% octahedral for the 1:12 ratio of the Keggin ion. This slight discrepancy is likely due to differences in different relaxation rates of the two sites.

Since the soluble polycation species detected in the treatment solution match the building blocks of the floc that neutralizes and precipitates the MS-2; this provides evidence that these soluble polycations are indeed effective active ingredients of aluminum coagulants that partake in neutralization of the anionic contaminants.

An identical experiment of MS-2 neutralization/precipitation was also carried out using $GaAl_{12}$. This study similarly showed the broad octahedral aluminum peaks by $^{27}Al$ NMR, and no tetrahedral peaks. Unfortunately, we could not observe the $GaO_4$ by $^{71}Ga$ NMR in the MS-2-$GaAl_{12}$ floc: the sample size was too small with the Ga quite dilute, in addition to the NMR signal being greatly diminished by distortion of the polyhedron upon neutralization and precipitation of MS-2.

We also precipitated alumina flocs in a dilute carbonate buffer solution (without added contaminants) in order to compare the precipitates from alum, $Al_{13}$ and $GaAl_{12}$. In these studies, we added the alum, $Al_{13}$ or $GaAl_{12}$-containing solutions to the buffer solution (pH ~8.3), rather than adding base to the alumina solutions, as was done in most prior studies on characterization of alumina gels. This was to more closely simulate a water treatment scenario, in which alum or PACl is added to raw water that has a higher pH (generally 6.5-8.5) than aqueous alumina solutions. The chemical shifts and ratios are reported in Table 4; and distinct differences are observed. All $^{27}Al$ MAS NMR spectra, of course, are dominated by the octahedral aluminum peak, between 4-8 ppm. These are broad peaks that can be deconvoluted into several smaller peaks, but for comparison purposes we report them as a single peak in Table 8.

The $Al_{13}$ precipitate, similar to the MS-2-$Al_{13}$ precipitate, has both the $Al_{13}$ and $Al_{30}$ $AlO_4$ site. However, they are present in approximately equal amounts. The solution from which this solid was precipitated was more aged, so conversion of $Al_{13}$ to $Al_{30}$ is indeed an issue to consider in the shelf-life of $Al_{13}$, or PACl solutions for water treatment. Very little 5-coordinate aluminum is observed. The $^{71}Ga$ MAS NMR of the $GaAl_{12}$ precipitate has only one tetrahedral peak at δ=129 ppm, compared to the previously reported peak at δ=122 ppm for similarly-prepared gels. Both the $GaAl_{12}$ and alum $^{27}Al$ NMR spectra have a single tetrahedral (δ=67.6 ppm) and 5-coodinate (δ=35.0 ppm) aluminum peak, with alum having a greater percentage of both. By the position of the tetrahedral peak, it is clearly not an $Al_{13}$-like specie, nor an $Al_{30}$-like specie. The small amount of 4-coordinate and 5-coordinate aluminum from the $GaAl_{12}$ (total=11%) likely comes from either 1) colloidal alumina present in the 'crude solution' rather than from the Keggin ions; in that preparation of this solution involves extensive heating (9.5 hours) at 90° C.; or 2) monomeric aluminum: $^{27}Al$ NMR of the crude $GaAl_{12}$ solution does have a monomeric $Al(H_2O)_6$ peak.

To summarize the MAS NMR study of the alumina flocs, all of the tetrahedral, 5-coordinate and octahedral species observed in the alum precipitate are derived from monomeric ($[Al(H_2O)_6]$ aluminum, and the tetrahedral site observed is not indicative of the $Al_{13}$ Keggin ion. Both the $Al_{13}$ and $GaAl_{12}$ precipitates reflect preservation of the Keggin ions, and the $Al_{30}$ ion, resulting from aging of the $Al_{13}$ solution. Conversion of $Al_{13}$ to $Al_{30}$, and then larger colloids, observed throughout this study, clearly affects the shelf life of PACl water-treatment solutions. There is no evidence for $GaAl_{12}$ undergoing this reaction, which may be one key to its surprisingly improved ability to neutralize and precipitate anionic contaminants.

Regarding the issue of $Al_{30}$ as an effective contaminant-neutralization ion; our studies indicated qualitatively that $Al_{30}$ is less effective than the Keggin ion. We observed that as $Al_{13}$ solutions age, they became less effective, and contained more $Al_{30}$. We also note that $Al_{13}$ solutions lose soluble aluminum with time, reflected in ICP MS analyses, which is probably due to the conversion of $Al_{30}$ to larger colloids that precipitate.

Small differences in the efficacy of water-treatment technologies at low cost can potentially mean more reliable treatment of challenged water supplies. Here we show that a single-atom substitution in the common molecule in water treatment coagulants (PACl) markedly enhances contaminant-removal performance and improves shelf life. The $GaAl_{12}$ has proven a superior coagulant reagent in every single test due to its kinetic stability high charge in aqueous media: both in its lower acidity and tendancy not to form larger clusters and oligomers. The extra cost of producing $GaAl_{12}$ is likely not much more than the cost of producing PACl, since a small amount of Ga (<8%) is needed on a per-molecule basis. Similarly the labor involved in preparing crude $GaAl_{12}$ is comparable to producing PACl. Furthermore, gallium is innocuous, as well as sequestered in the core of the cluster with no contact to the surrounding aqueous medium. Additionally, cost savings in its usage are potentially recovered since our studies show the improved efficacy and shelf-life of $GaAl_{12}$-based additives means lower dose rates per volume of water treated. Finally, stability and thus contaminant removal efficacy of the aluminum Keggin cluster is compromised by increased cluster charge, as seen in the case of $GeAl_{12}$.

In summary, the present invention has the following advantages over the commercial coagulant agents now in common use, such as ferric chloride, alum, and polyaluminum chloride. Those advantages include: (a) efficacy under a wider range of naturally occurring conditions, including pH, temperature and alkalinity; (b) greater effectiveness in waters of high pH (pH 6.3 to 8.2) without adjustment; (c) doesn't require lime supplementation, and is more effective in softer water than is alum; (d) greater stability and longer shelf life than obtained with alum or polyaluminum chloride; (e) does not stain treatment equipment as do ferric compounds; and (f) comprised of well-defined, monospecific molecular species, unlike the variable mixtures present in polyaluminum chloride products.

As for operating ranges, the compounds of the present invention are most efficacious in a pH range of 6.3 to 8.0 without pH adjustment, and can be useful at lower pH if calcium is present at one millimolar concentration or higher. $GaAl_{12}$ performs well in alkalinity conditions of trace to 400 mg/L (as $CaCO_3$). Coagulation is effective at temperatures of 5 to 40 degrees C., although below 10 C it benefits from the addition of a polymeric flocculation aid (as do other coagulants).

TABLE 1

Comparison of $Al_{13}$ and $GaAl_{12}$ coagulants for removal of MS-2 Bacteriophage from Laboratory Solutions

| Reaction | Coagulant* | Al concentration (ppm) | Dilution for Plate | Raw cfu | Total pfu/mL | Mean pfu/mL | Log Reduction Value |
|---|---|---|---|---|---|---|---|
| A | Control | N/A | 5.00E+05 | 64 | 3.20E+07 | 3.65E+07 | N/A |
|   |   |   |   | 82 | 4.10E+07 |   |   |
| B | $Al_{13}$ | 34 | 1.00E+01 | 4 | 4.00E+01 | 2.50E+01 | 6 |
|   |   |   |   | 1 | 1.00E+01 |   |   |
| C | $GaAl_{12}$ | 34 | 1.00E+01 | 2 | 2.00E+01 | 1.00E+01 | 7 |
|   |   |   |   | 0 | 0.00E+00 |   |   |
| D | control | N/A | 8.00E+05 | 997 | 7.98E+08 | 7.50E+08 | N/A |
|   |   |   |   | 878 | 7.02E+08 |   |   |
| E | $Al_{13}$ | 34 | 1.00E+01 | 205 | 2.05E+03 | 1.61E+03 | 5.67 |
|   |   |   |   | 116 | 1.16E+03 |   |   |
| F | $GaAl_{12}$ | 34 | 1.00E+01 | 70 | 7.00E+02 | 4.55E+02 | 6.22 |
|   |   |   |   | 21 | 2.10E+02 |   |   |
| G | Control | N/A | 5.00E+05 | 203 | 1.02E+08 | 9.83E+07 | N/A |
|   |   |   |   | 208 | 1.04E+08 |   |   |
|   |   |   |   | 179 | 8.95E+07 |   |   |
| H | $Al_{13}$ | 10 | 5.00E+01 | 30 | 1.50E+03 | 1.55E+03 | 4.80 |
|   |   |   |   | 30 | 1.50E+03 |   |   |
|   |   |   |   | 33 | 1.65E+03 |   |   |
| I | $GaAl_{12}$ | 10 | 1.00E+01 | 20 | 2.00E+02 | 2.10E+02 | 5.67 |
|   |   |   |   | 23 | 2.30E+02 |   |   |
|   |   |   |   | 20 | 2.00E+02 |   |   |

*two or three replications for each experiment

TABLE 2

Comparison of $Al_{13}$, $GaAl_{12}$, and alum coagulants for removal of wild-type bacteriophage from Rio Grande water

| reaction | Coagulant* | Al concentration (ppm) | Dilution for Plate | Raw cfu | Total pfu/mL | Mean pfu/mL | Log Reduction Value |
|---|---|---|---|---|---|---|---|
| A | control | N/A | 5.00E+05 | 100 | 5.00E+07 | 5.23E+07 | N/A |
|   |   |   | 5.00E+05 | 109 | 5.45E+07 |   |   |
| B | $Al_{13}$ | 10 | 1.00E+02 | 61 | 6.10E+03 | 5.90E+03 | 3.95 |
|   | $Al_{13}$ | 10 | 1.00E+02 | 57 | 5.70E+03 |   |   |
| C | $GaAl_{12}$ | 10 | 1.00E+02 | 2 | 2.00E+02 | 4.00E+02 | 5.12 |
|   | $GaAl_{12}$ | 10 | 1.00E+02 | 6 | 6.00E+02 |   |   |
| D | alum | 10 | 1.00E+03 | 790 | 7.90E+05 | 7.74E+05 | 1.83 |

TABLE 3

Clarification of Rio Grande water by $GaAl_{12}$ coagulant compared to $Al_{13}$, alum, and ferric chloride

| Coagulant/concentration | pH | Turbidity (NTU*) |
|---|---|---|
| Control (raw river water-no coagulant) | 8.18 | 54 |
| Ferric Chloride/10 ppm | 6.48 | 0.16 |
| Alum/10 ppm | 6.65 | 0.49 |
| $Al_{13}$/10 ppm | 7.50 | 1.26 |
| $GaAl_{12}$/10 ppm | 6.24 | 0.19 |

*nepholometric turbidity units

TABLE 4

Removal of Dissolved Organic Contaminants* from Rio Grande Water by $GaAl_{12}$, Compared to $Al_{13}$ and Alum

| Coagulant | Concentration (ppm) | pH after treatment | UV adsorption (254 nm) | Humic acid equiv. (mg/L) | Lime needed for pH adjustment | % removal | Residual aluminum (ICP-MS) |
|---|---|---|---|---|---|---|---|
| None (natural) | N/A | 8.21 | 0.113 | 3.94 | no | N/A | 0.112 |
| None (humic acid spiked) | N/A | 8.2 | 0.252 | 8.85 | no | N/A |   |

TABLE 4-continued

Removal of Dissolved Organic Contaminants* from Rio Grande Water by $GaAl_{12}$, Compared to $Al_{13}$ and Alum

| Coagulant | Concentration (ppm) | pH after treatment | UV adsorption (254 nm) | Humic acid equiv. (mg/L) | Lime needed for pH adjustment | % removal | Residual aluminum (ICP-MS) |
|---|---|---|---|---|---|---|---|
| Alum | 5 | 7.3 | 0.108 | 3.76 | no | 58% | |
| Alum | 10 | 7.0 | 0.078 | 2.70 | no | 69% | |
| Alum | 20 | 6.7 | 0.050 | 1.71 | no | 81% | |
| Alum | 40 | 6.5 | 0.043 | 1.46 | yes | 83% | 0.085 |
| $Al_{13}$ | 5 | 7.9 | 0.075 | 2.59 | no | 71% | 0.049 |
| $GaAl_{12}$ | 2 | 6.3 | 0.035 | 1.18 | no | 87% | 0.033 |
| $GaAl_{12}$ | 5 | 6.2 | 0.027 | 0.90 | yes | 90% | 0.042 |

*spiked with humic acid

TABLE 5

Comparison of Coagulants for *Cryptosporidium parvum* (*C. parvum*) and Turbidity Removal

| Coagulant/concentration | *C. parvum* concentration (per mL) | Percent removal of *C. parvum* | pH | Turbidity (NTU)* |
|---|---|---|---|---|
| EPA standard for turbidity | | | | 0.3§ |
| Control (raw river water, no coagulant) | $1.02 \times 10^7$ | N/A | 8.13 | 54 |
| Ferric chloride/10 mg/L | $7.98 \times 10^5$ | 92.2 | 6.80 | 0.16 |
| Alum/10 mg/L | $8.42 \times 10^6$ | 17.5 | 6.75 | 0.49 |
| $GeAl_{12}$/10 mg/L | $3.07 \times 10^5$ | 97.0 | 7.48 | 3.38 |
| $Al_{13}$/10 mg/L | $1.29 \times 10^5$ | 98.7 | 7.56 | 1.26 |
| $GaAl_{12}$/10 mg/L | $1.10 \times 10^5$ | 98.9 | 7.50 | 0.19 |

*nephelometric turbidity units
§95% of NTU readings of finished water must be 0.3; and cannot go above 1.0

TABLE 6

$GeAl_{12}$, $Al_{13}$ and $GaAl_{12}$ Coagulants for Dissolved Organic Contaminant Removal from River Water

| Coagulant | Concentration mg/L | Resulting pH | Treatment at 5° C. Abs. 254 nm | Treatment at 5° C. DOC mg/L* | Treatment at 21° C. Abs. 254 nm | Treatment at 21° C. DOC mg/L |
|---|---|---|---|---|---|---|
| Untreated Water | NA | 8.1 | | | | |
| $GeAl_{12}$ | 5 | 7.7 | 0.057 | 1.94 | 0.051 | 1.71 |
| $Al_{13}$ | 5 | 7.8 | 0.056 | 1.88 | 0.044 | 1.46 |
| $GaAl_{12}$ | 5 | 7.7 | 0.042 | 1.40 | 0.038 | 1.24 |
| Alum | 5 | 7.0 | 0.071 | 2.44 | 0.068 | 2.32 |
| $FeCl_3$ | 5 | 7.2 | 0.106 | 3.67 | 0.101 | 3.49 |

*DOC equivalent to mg/L humic acid, based on a standard curve of humic acid obtained from Alpha Aesar.

TABLE 7

Dominant ions§ detected by ESI-MS in aqueous solution of $GaAl_{12}$, $Al_{13}$ and $GeAl_{12}$

| Specie | m/z | Number of deprotonation steps from parent cluster* |
|---|---|---|
| $GaAl_{12}$ | | |
| $[GaAl_{12}O_5(OH)_{26}]^{3+}$ | 311 | 4 |
| $[GaAl_{12}O_4(OH)_{27}(NO_3)]^{3+}$ | 326 | 3 |
| $[GaAl_{12}O_5(OH)_{26}(NO_3)]^{2+}$ | 488 | 4 |

TABLE 7-continued

Dominant ions§ detected by ESI-MS in aqueous solution of $GaAl_{12}$, $Al_{13}$ and $GeAl_{12}$

| Specie | m/z | Number of deprotonation steps from parent cluster* |
|---|---|---|
| $[GaAl_{12}O_5(OH)_{27}]^{2+}$ | 466 | 5 |
| $[GaAl_{12}O_4(OH)_{30}(H_2O)_3Na]^{2+}$ | 522 | 6 |
| $Al_{13}$ | | |
| $[Al_{13}O_4(OH)_{28}]^{3+}$ | 297 | 4 |
| $[Na_2Al_{13}O_6(OH)_{26}]^{3+}$ | 312 | 6 |
| $[Al_{13}O_4(OH)_{29}(H_2O)_2]^{2+}$ | 472 | 5 |
| $[Na_2Al_{13}O_5(OH)_{29}]^{2+}$ | 485 | 7 |
| $[Al_{30}O_8(OH)_{64}(H_2O)_{10}(NO_3)_6]^{4+}$ | 645 | 8 |
| $GeAl_{12}$ | | |
| $[GeAl_{12}O_7(OH)_{23}(H_2O)]^{3+}$ | 306 | 6 |
| $[GeAl_{12}O_4(OH)_{30}(H_2O)]^{2+}$ | 495 | 6 |
| $[GeAl_{12}O_8(OH)_{21}(NO_3)]^{2+}$ | 472 | 8 |
| $[GeAl_{12}O_4(OH)_{29}(H_2O)_5]^{3+}$ | 348 | 5 |

§The most abundant specie for each dehydration series observed (see text).
*$MAl_{12}(O)_{4+x}(OH)_{24+y}$ (M = Ga, Al, Ge)
one deprotonation for each y: $H_2O \rightarrow OH^- + H^+$
two deprotonation for each x: $H_2O \rightarrow OH^- + H^+$
$OH^- \rightarrow O^{2-} + H^+$

TABLE 8

MAS NMR ($^{71}$Ga and $^{27}$Al) peaks observed for $Al_{13}$, $GaAl_{12}$ and alum precipitates.

| | $Al_{13}$ neutralized MS-2¥ | $Al_{13}$ Floc | $GaAl_{12}$ neutralized MS-2¥ | $GaAl_{12}$ Floc | alum Floc |
|---|---|---|---|---|---|
| Tetrahedral | | | | | |
| δ (ppm) | | 63.6 | N/A§ | 129 ($^{71}$Ga NMR) | |
| % | | 5.4 | | | |
| δ (ppm) | 63.1 | 70 | | 67.6 | 67.6 |
| % | 10 | 5.6 | | 6.2 | 8.5 |
| 5-coordinate | | | | | |
| δ (ppm) | | 34.8 | none | 35.0 | 35.0 |
| % | none | 1.4 | | 5.0 | 9.8 |
| Octahedral | | | | | |
| δ (ppm) | 4.9 | 8.0 | 8.9 | 8.9 | 8.0 |
| % | 90 | 87.6 | 100 | 88.8 | 81.7 |

§$GaO_4$ site too distorted and dilute to observe by $^{71}$Ga NMR; no $^{27}$Al tetrahedral sites observed
¥MS-2 bacteriophage neutralized and precipitated by $Al_{13}$ or $GaAl_{12}$.

What is claimed is:

1. A method of removing anionic contaminants from contaminated water, comprising adding at least 2 ppm of a $GaAl_{12}$ coagulant to the contaminated water to form flocs; and removing the flocs from the contaminated water by filtration, thereby producing cleaner water.

2. The method of claim 1, comprising adding no more than 10 ppm of $GaAl_{12}$ to the contaminated water.

3. The method of claim 1, comprising adding 5 ppm of $GaAl_{12}$ to the contaminated water.

4. The method of claim 1, wherein the $GaAl_{12}$ coagulant is in the form of a prehydrolyzed material having the composition $[GaAl_{12}O_4(OH)_{24}(H_2O)_{12}]^{7+}$.

5. The method of claim 1, wherein the pH of the contaminated water to be treated is in the range of 6.3 to 8.2.

6. The method of claim 1, wherein the method does not comprise adding lime supplementation.

7. The method of claim 1, wherein the contaminated water to be treated has an alkalinity of up to 400 mg/L as $CaCO_3$.

8. The method of claim 1, further comprising adding a polymeric flocculation aid at water temperatures below 10 C.

9. The method of claim 1, further comprising adding calcium to the contaminated water at a concentration of at least 1 millimolar, when the pH of the water is less than 6.3.

10. A method of removing anionic contaminants from contaminated water, comprising adding at least 2 ppm of a $GeAl_{12}$ coagulant to the contaminated water to form flocs; and removing the flocs from the contaminated water by filtration, thereby producing cleaner water.

11. The method of claim 10, comprising adding no more than 10 ppm of $GeAl_{12}$ to the contaminated water.

12. The method of claim 10, comprising adding 5 ppm of $GeAl_{12}$ to the contaminated water.

13. The method of claim 10, wherein the $GeAl_{12}$ coagulant is in the form of a prehydrolyzed material having the composition $[GaAl_{12}O_4(OH)_{24}(H_2O)_{12}]^{8+}$.

14. A method of removing anionic contaminants from contaminated water, comprising adding 2-10 ppm of $GaAl_{12}$ coagulant to the contaminated water, forming flocs, and then removing the flocs from the contaminated water by filtration, thereby producing cleaner water.

15. The method of claim 14, wherein the pH of the contaminated water to be treated is in the range of 6.3 to 8.2.

16. The method of claim 14, wherein the method does not comprise adding lime supplementation.

17. The method of claim 14, wherein the contaminated water to be treated has an alkalinity of up to 400 mg/L as $CaCO_3$.

18. The method of claim 14, further comprising adding a polymeric flocculation aid at water temperatures below 10 C.

19. The method of claim 14, further comprising adding calcium to the contaminated water at a concentration of at least 1 millimolar, when the pH of the water is less than 6.3.

* * * * *